(12) United States Patent
Yoon et al.

(10) Patent No.: US 12,319,208 B2
(45) Date of Patent: Jun. 3, 2025

(54) REMOVABLE VEHICLE PARTITION

(71) Applicants: Hyundai Motor Company, Seoul (KR); Kia Corporation, Seoul (KR)

(72) Inventors: Jinseok Yoon, Seoul (KR); Seok Cheol Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 603 days.

(21) Appl. No.: 17/456,736

(22) Filed: Nov. 29, 2021

(65) Prior Publication Data
US 2022/0355747 A1   Nov. 10, 2022

(30) Foreign Application Priority Data
May 4, 2021   (KR) .................. 10-2021-0057734

(51) Int. Cl.
| | |
|---|---|
| *B60R 13/08* | (2006.01) |
| *B60R 21/02* | (2006.01) |
| *B62D 31/00* | (2006.01) |
| *B62D 25/00* | (2006.01) |

(52) U.S. Cl.
CPC ............ *B60R 13/08* (2013.01); *B60R 21/026* (2013.01); *B60R 13/0815* (2013.01); *B60R 13/0823* (2013.01); *B62D 25/00* (2013.01); *B62D 31/00* (2013.01)

(58) Field of Classification Search
None
See application file for complete search history.

(56) References Cited

U.S. PATENT DOCUMENTS

| | | | | |
|---|---|---|---|---|
| 2,998,279 | A | * | 8/1961 | Mateny ................. B60R 21/026 296/85 |
| 3,166,116 | A | * | 1/1965 | Cole, Jr. ................ B60J 1/2011 160/369 |
| 3,214,211 | A | * | 10/1965 | Setina ..................... B60R 21/12 296/85 |
| 3,810,262 | A | * | 5/1974 | Strand ...................... E04H 3/16 417/43 |
| 4,095,837 | A | * | 6/1978 | Hunter .............. B60H 1/00592 49/404 |
| 4,366,977 | A | * | 1/1983 | Davis ...................... B60P 3/205 410/129 |
| 4,621,856 | A | * | 11/1986 | McKenzie ........... B60R 21/026 280/749 |
| 3,044,800 | A | * | 11/1987 | Wicker ................. B60R 21/026 220/535 |
| 4,708,384 | A | * | 11/1987 | LaRosa ................... B60R 21/12 296/24.46 |
| 4,938,518 | A | * | 7/1990 | Willemsen .......... B60R 13/0823 296/24.41 |
| 4,971,378 | A | * | 11/1990 | Setina ..................... B60R 21/12 16/76 |
| 5,238,282 | A | * | 8/1993 | Watson .............. B60R 13/0823 296/24.41 |
| 5,382,068 | A | * | 1/1995 | Simmons ........... B60R 13/0823 160/327 |

(Continued)

*Primary Examiner* — Phi D A
(74) *Attorney, Agent, or Firm* — Slater Matsil, LLP

(57) ABSTRACT

A removable vehicle partition is disclosed. In an embodiment a removable vehicle partition includes an inflatable tube and at least one vehicle body frame fixing bar connected to the inflatable tube and configured to fix the inflatable tube inside a vehicle body.

20 Claims, 14 Drawing Sheets

(56) References Cited

U.S. PATENT DOCUMENTS

| | | | | |
|---|---|---|---|---|
| 5,511,842 | A * | 4/1996 | Dillon | B60N 2/24 |
| | | | | 224/400 |
| 5,536,057 | A * | 7/1996 | Stewart | B60R 21/12 |
| | | | | 296/37.16 |
| 5,651,562 | A * | 7/1997 | Hagen | B60R 21/216 |
| | | | | 280/728.2 |
| 6,086,128 | A * | 7/2000 | Whitehead, Sr. | B60R 21/06 |
| | | | | 160/354 |
| 6,105,653 | A * | 8/2000 | Armstrong | B60H 1/00592 |
| | | | | 296/141 |
| 7,726,688 | B2 * | 6/2010 | Setina | B60R 21/06 |
| | | | | 280/730.2 |
| 8,171,681 | B2 * | 5/2012 | Miller | E06B 9/02 |
| | | | | 52/2.14 |
| 8,690,216 | B2 * | 4/2014 | Sage | B60R 21/12 |
| | | | | 296/24.42 |
| 9,937,889 | B2 * | 4/2018 | Richter | B60J 1/00 |
| 10,919,478 | B2 * | 2/2021 | O'Connor | B60R 5/02 |
| 11,027,673 | B1 * | 6/2021 | Abdelrahman | B60R 21/026 |
| 2019/0380299 | A1 * | 12/2019 | Shewfelt | B60R 22/10 |
| 2022/0097639 | A1 * | 3/2022 | McClymont | B60R 21/026 |
| 2022/0212619 | A1 * | 7/2022 | Porter | B60R 21/026 |

* cited by examiner

REMOVABLE VEHICLE PARTITION

CROSS-REFERENCE TO RELATED APPLICATIONS

This application claims the benefit to Korean Patent Application No. 10-2021-0057734, filed in the Korean Intellectual Property Office on May 4, 2021, which application is hereby incorporated herein by reference.

TECHNICAL FIELD

The present invention relates to a removable vehicle partition. More particularly, the present invention relates to a removable vehicle partition that is easy to store, mount and detach.

BACKGROUND

In order to transport a suspected infection patient or a patient infected with a virus or bacteria using a vehicle, it is necessary to isolate the vehicle driver from the suspected patient.

In order to mount an isolation partition for a general vehicle, vehicle modification is required, and considerable time and cost are required for vehicle modification.

SUMMARY

Embodiments provide a removable vehicle partition for transporting suspected virus patients, which is easy to mount and detach.

A removable vehicle partition according to an exemplary embodiment may include an inflatable tube, and at least one vehicle body frame fixing bar connected to the inflatable tube and fixing the inflatable tube inside a vehicle body.

The removable vehicle partition according to an exemplary embodiment may further include a sealing pad attached to the outside of the inflatable tube to closely connect the inflatable tube and the vehicle body.

The sealing pad may include a silicone pad that is adhered to the inside of the vehicle body.

The sealing pad may include a foam pad that adheres to the inside of the vehicle body.

The sealing pad may include at least two silicone pads that are adhered to the inside of the vehicle body, and a foam pad closely attached to the inside of the vehicle body and provided between the silicone pads.

The vehicle body frame fixing bar may include a first fixing bar inserted and fixed in an air bag cover hole of the vehicle body.

The first fixing bar may include an insert portion provided at both ends of the first fixing bar to be inserted into the air bag cover hole, and a clip that is mounted on the insert portion with elastic.

The first fixing bar may include at least two connecting pipes, wherein an inner thread may be formed in any one of the at least two connecting pipes and an outer thread engaging in the inner thread may be formed in at least the other one, and wherein the length of the first fixing bar may be adjusted by rotating any one of the at least two connection pipes.

The vehicle body frame fixing bar may further include a second fixing bar fixed in close contact with the vehicle body.

The second fixing bar may include friction pads that are provided at both ends of the second fixing bar and adhere to the vehicle body, wherein the second fixing bar may include an upper bar that is spaced apart from the first fixing bar and mounted on its upper part, and a lower bar that is spaced apart from the first fixing bar and mounted on its lower part.

The second fixing bar may include at least two connecting pipes, wherein an inner thread may be formed in any one of the at least two connecting pipes, and an outer thread engaging with the inner thread may be formed in at least the other one, and wherein the length of the second fixing bar may be adjusted by rotating any one of the at least two connecting pipes.

The removable vehicle partition according to an exemplary embodiment may further include a fixing portion connected to the inflatable tube to fix the inflatable tube to the vehicle body, wherein the fixing portion may include a hook fixed to the vehicle body, and a band of an elastic material connecting the hook and the inflatable tube.

The removable vehicle partition according to an exemplary embodiment may further include a partition glass of a transparent material mounted on the inflatable tube.

The removable vehicle partition according to an exemplary embodiment may further include an air inlet formed in the inflatable tube.

The removable vehicle partition according to an exemplary embodiment may further include an extractor grill mounted on the inflatable tube, allowing air circulation from the vehicle body front part separated by the inflatable tube to the vehicle body rear part, and blocking the air circulation from the vehicle body rear part to the front part of the vehicle body.

The removable vehicle partition according to an exemplary embodiment may further include a storage box for accommodating the inflatable tube and the vehicle body frame fixing bar.

The removable vehicle partition according to an exemplary embodiment may further include a tire mobility kit for injecting air into the inflatable tube.

The removable vehicle partition according to an exemplary embodiment is easy to mount and separate without changing the structure of the vehicle, so it is possible to transport suspected virus patients.

BRIEF DESCRIPTION OF THE DRAWINGS

Since these drawings are for reference in describing an exemplary embodiment of the present invention, the technical spirit of the present invention should not be construed as being limited to the accompanying drawings.

DETAILED DESCRIPTION OF ILLUSTRATIVE EMBODIMENTS

Figure 1:
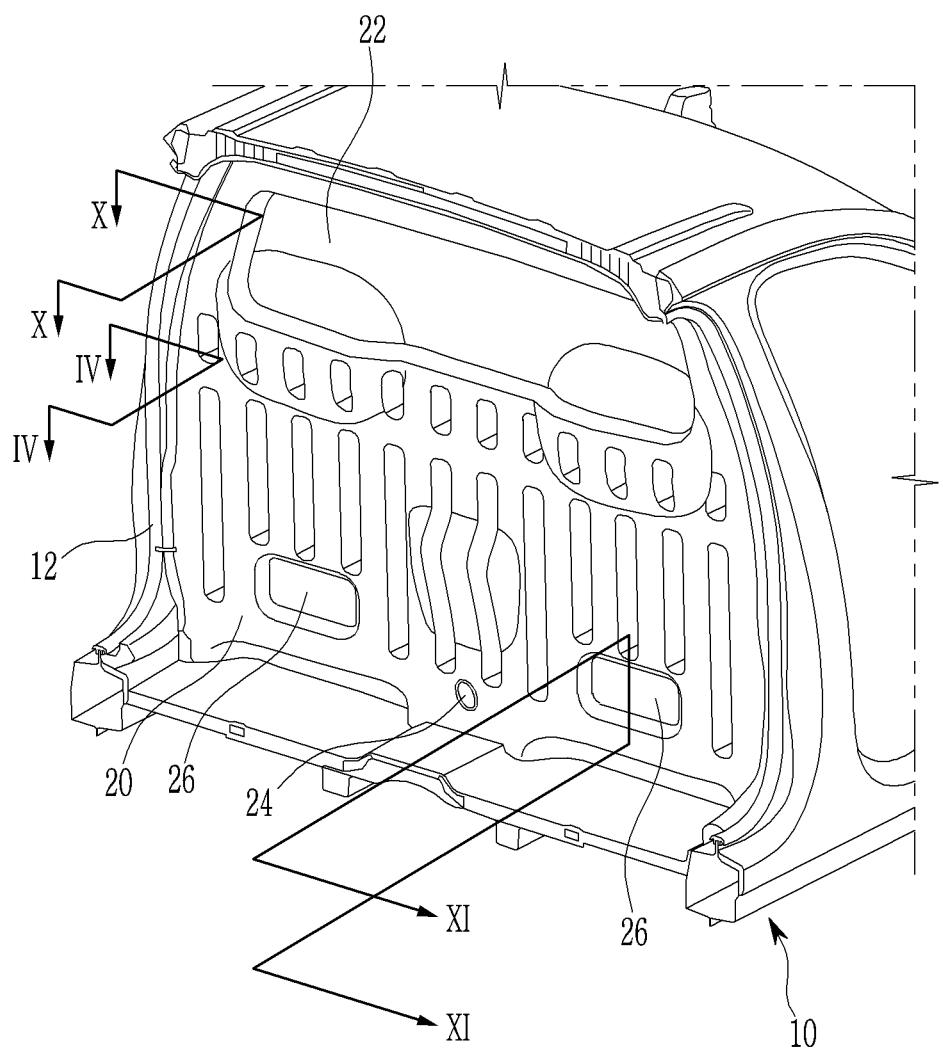
FIG. 1 is a partial perspective view of a vehicle body to which a removable vehicle partition according to an exemplary embodiment may be applied.

The present invention will be described more fully hereinafter with reference to the accompanying drawings, in which exemplary embodiments are shown. As those skilled in the art would realize, the described embodiments may be modified in various different ways, all without departing from the spirit or scope of the present invention.

In order to clearly explain the present invention, parts irrelevant to the description are omitted, and the same reference numerals are assigned to the same or similar elements Since the size and thickness of each component shown in the drawings are arbitrarily indicated for convenience of description, the present invention is not necessarily limited to the that shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as . . . part, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment will hereinafter be described in detail with reference to the accompanying drawings.

Figure 2:
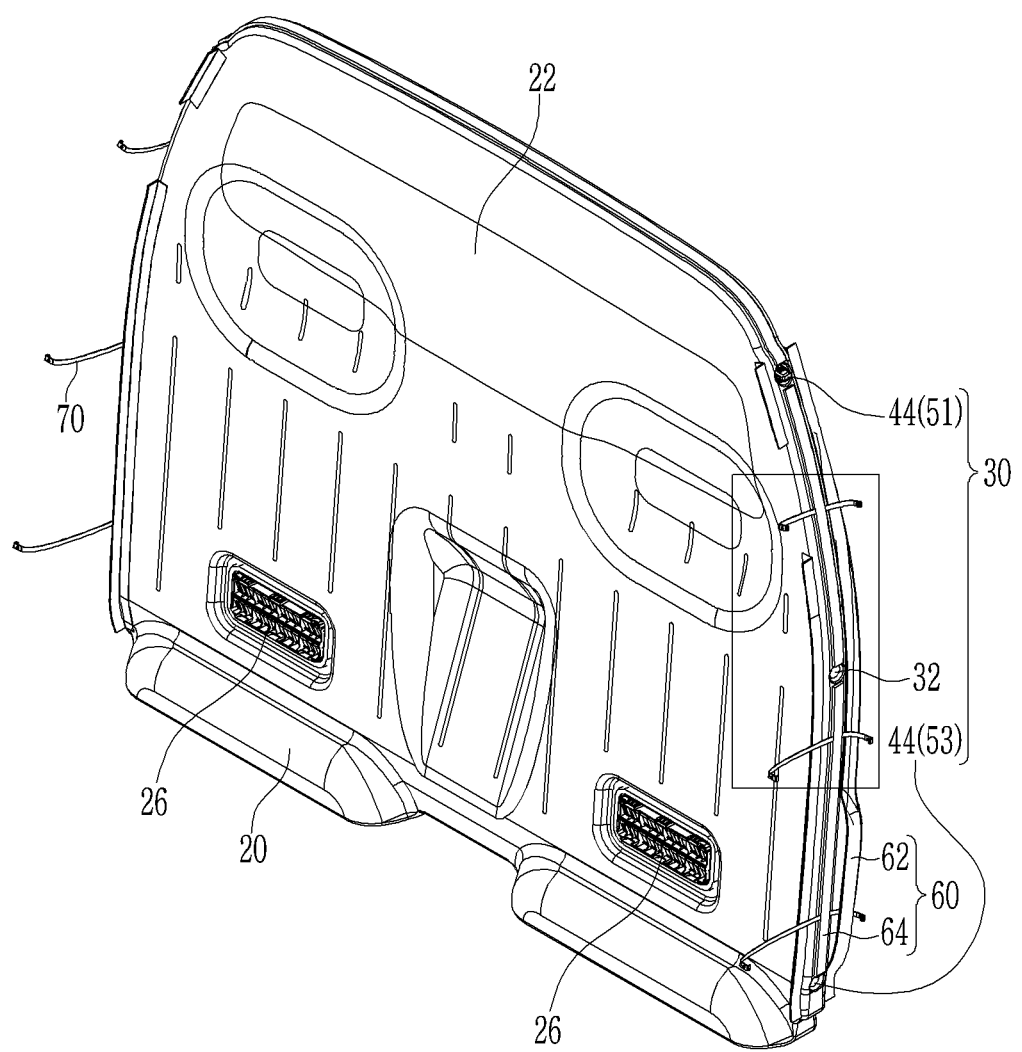
FIG. 2 is a perspective view of a removable vehicle partition according to an exemplary embodiment.

FIG. 1 is a partial perspective view of a vehicle body to which a removable vehicle partition according to an exemplary embodiment may be applied, and FIG. 2 is a perspective view of a removable vehicle partition according to an exemplary embodiment.

Referring to FIG. 1 and FIG. 2, a removable vehicle partition according to an exemplary embodiment may include an inflatable tube 20 and at least one vehicle body frame fixing bar 30 connected to the inflatable tube 20 and fixing the inflatable tube 20 inside a vehicle body 10.

The vehicle body frame fixing bar 30 is illustrated as being provided on the inside of the inflatable tube 20, but is not limited thereto, it is fixed on the outside of the inflatable tube 20 to fix the inflatable tube 20 to the vehicle body.

The removable vehicle partition according to an exemplary embodiment does not require modification of the vehicle body because it uses the inflatable tube 20, and can be mounted on the vehicle body without using a separate mounting bracket, etc.

The removable vehicle partition according to an exemplary embodiment can be mounted on a B pillar 12 of the vehicle body 10 to safely transport a driver and a patient infected with virus or bacteria.

The removable vehicle partition according to an exemplary embodiment may further include a partition glass 22 of a transparent material mounted on the inflatable tube 20.

The partition glass 22 allows the driver to check the condition of the infected patient at the back, so it is possible to respond to emergency situations. For example, the partition glass 22 may be a transparent material vinyl, but is not limited thereto.

Figure 3:
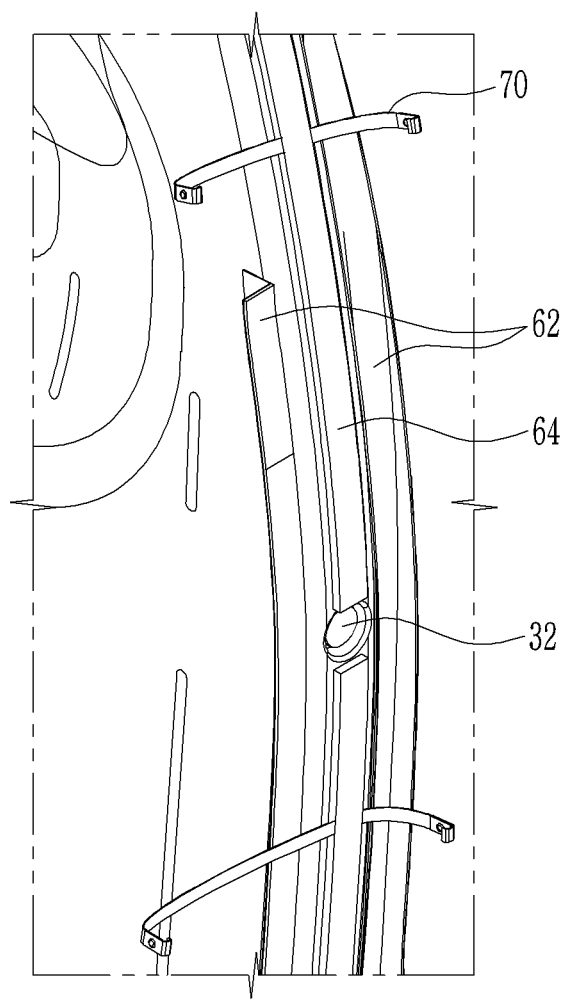
FIG. 3 is a partial perspective view of a removable vehicle partition according to an exemplary embodiment.
Figure 4:
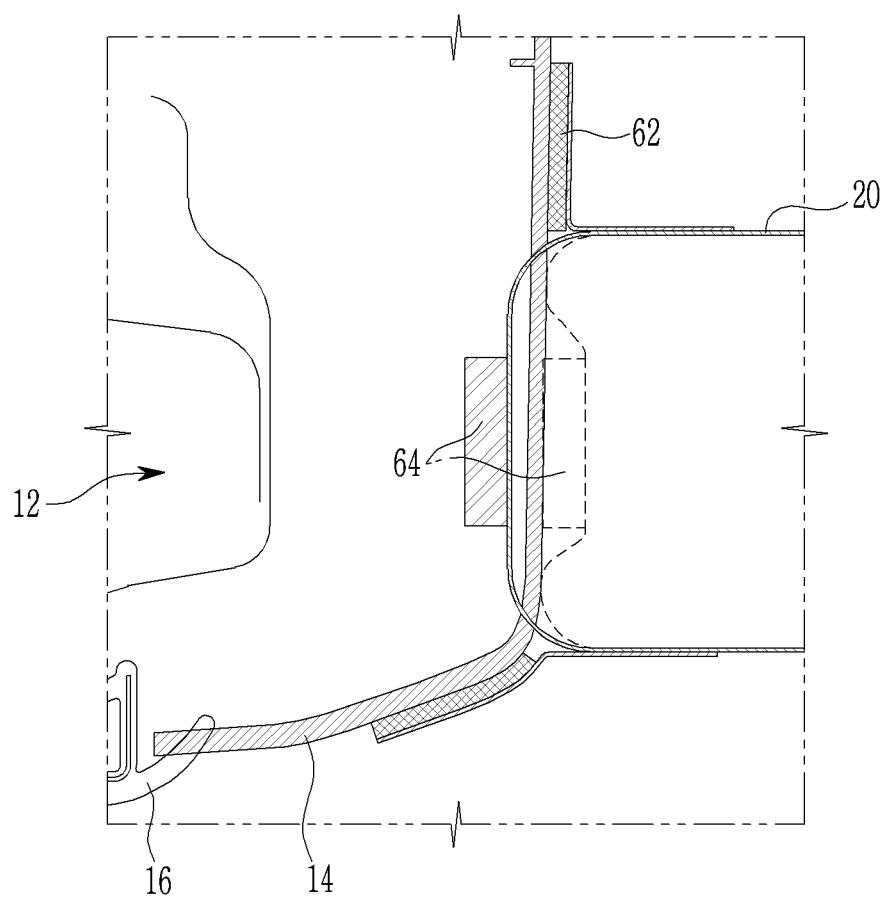
FIG. 4 is a cross-sectional view along the IV-IV line of FIG. 1.

FIG. 3 is a partial perspective view of a removable vehicle partition according to an exemplary embodiment, and FIG. 4 is a cross-sectional view along the IV-IV line of FIG. 1.

Referring to FIG. 1 to FIG. 4, the removable vehicle partition according to an exemplary embodiment may further include a sealing pad 60 attached to the outside of the inflatable tube 20 to closely connect the inflatable tube 20 and the vehicle body 10. The sealing pad 60 can close the inflatable tube 20 to the vehicle body 10 to block the possibility of virus or bacterial infection to the driver.

The sealing pad 60 may include a silicone pad 62 that is adhered to the inside of the vehicle body 10. For example, the silicone pad 62 is an adhesive material and can be used semi-permanently as a material that can be easily washed with water.

The sealing pad 60 may include a foam pad 64 that adheres to the inside of the vehicle body 10. The foam pad 64 is a soft material such as PU (Poly Urethane), and it is provided between the inflatable tube 20 and the vehicle body so that it can be closely attached even if there is a curved shape inside the vehicle body.

As shown in FIG. 4, the sealing pad 60 may include at least two silicone pads 62 that are adhered to the inside of the vehicle body 10, and a foam pad 64 that is in close contact with the inside of the vehicle body 10 and is provided between the silicone pads 62.

That is, the silicone pads 62 closely adhere the foam pad 64 to the pillar trim 14 of the B pillar 12, and the silicone pads 62 adhere to the B pillar 12 to provide a double/triple sealing structure. Therefore, it is possible to prevent the contaminated air in the vehicle cabin from being transmitted to the driver's seat.

Figure 5:
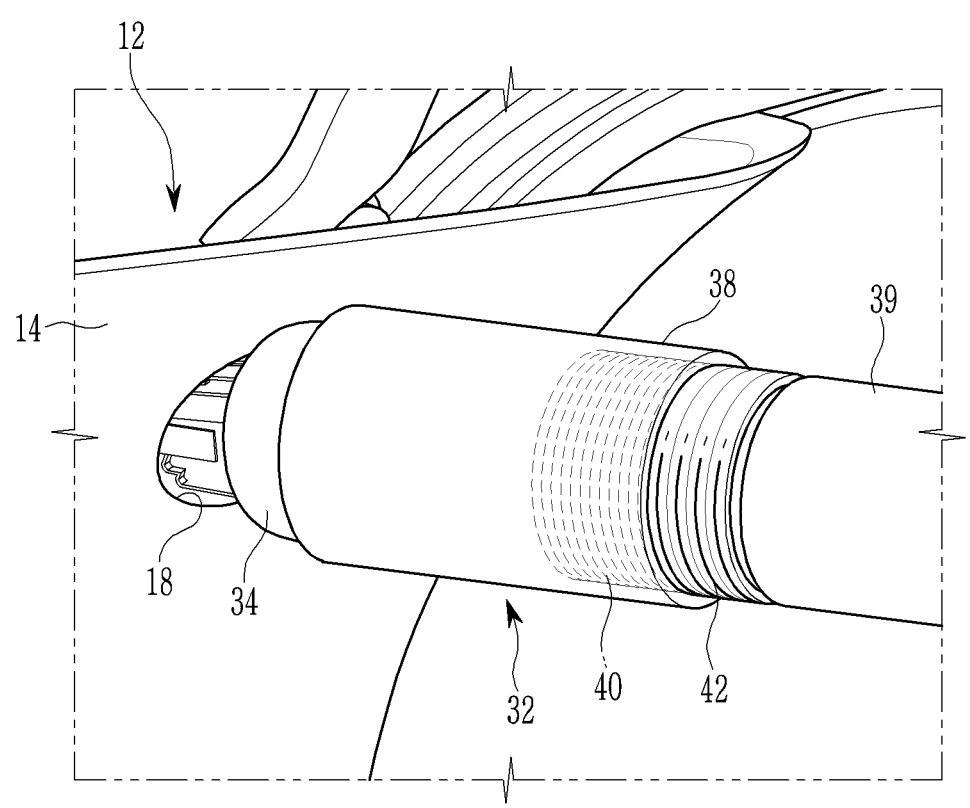
FIG. 5 and FIG. 6 are each a partial perspective view showing a first fixed bar of the removable vehicle partition according to an exemplary embodiment.
Figure 6:
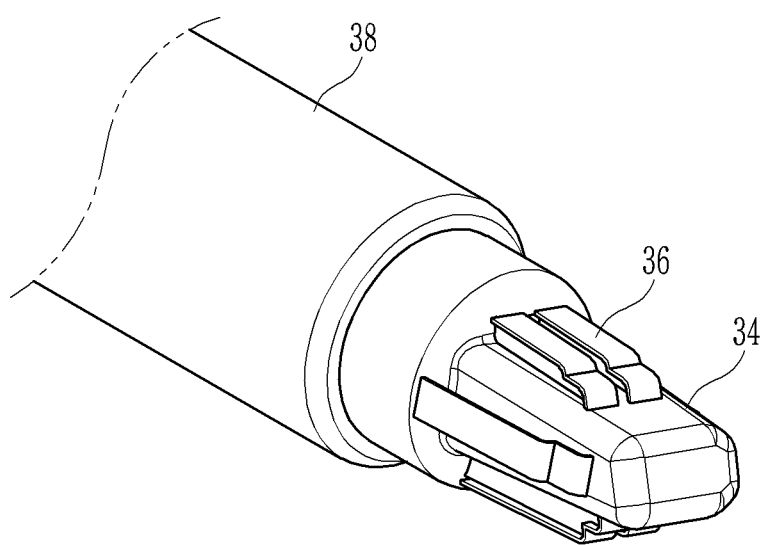

FIG. 5 and FIG. 6 is a partial perspective view showing a first fixed bar of the removable vehicle partition according to an exemplary embodiment.

Referring to FIG. 1, FIG. 2 FIG. 5 and FIG. 6, the vehicle body frame fixing bar 30 may include a first fixing bar 32 inserted and fixed in an air bag cover hole 18 of the vehicle body 10.

In general, the B pillar of the vehicle is provided with an air bag cover hole for mounting an air bag and an air bag cap for blocking the air bag cover hole, and in an exemplary embodiment, the air bag cover is separated from the air bag cover and the first fixing bar 32 may be connected into the air bag cover hole 18. That is, the removable vehicle partition according to an exemplary embodiment can easily mount and detach the vehicle partition by fixing the first fixing bar 32 to the air bag cover hole 18 without a separate mounting bracket, and the inflatable tube 20 can be firmly fixed.

The first fixing bar 32 may include an insert portion 34 provided at both ends of the first fixing bar 32 to be inserted into the air bag cover hole 18.

The first fixing bar 32 may further include a clip 36 that is mounted on the insert portion 34 with elastic.

The clip 36 may be formed of metal or plastic having elasticity, and regardless of the size of the airbag cover hole 1, the first fixing bar 32 is fixed to or separated from the airbag cover hole 18.

The first fixing bar 32 includes at least two connecting pipes 38, and 39, an inner thread 40 is formed in any one of the at least two connecting pipes 38, and 39, and an outer thread 42 engaging in the inner thread 40 is formed in at least the other one. And the length can be adjusted by rotating any one of the at least two connection pipes 38 and 39.

Although the drawing shows that the inner thread 40 is formed on the outer connection pipe 38 and the outer thread 42 is formed on the inner connection pipe 39, but is not limited thereto, the opposite is also possible. And It is possible to adjust the length of the first fixing bar 32 by simple rotation operation.

Figure 7:
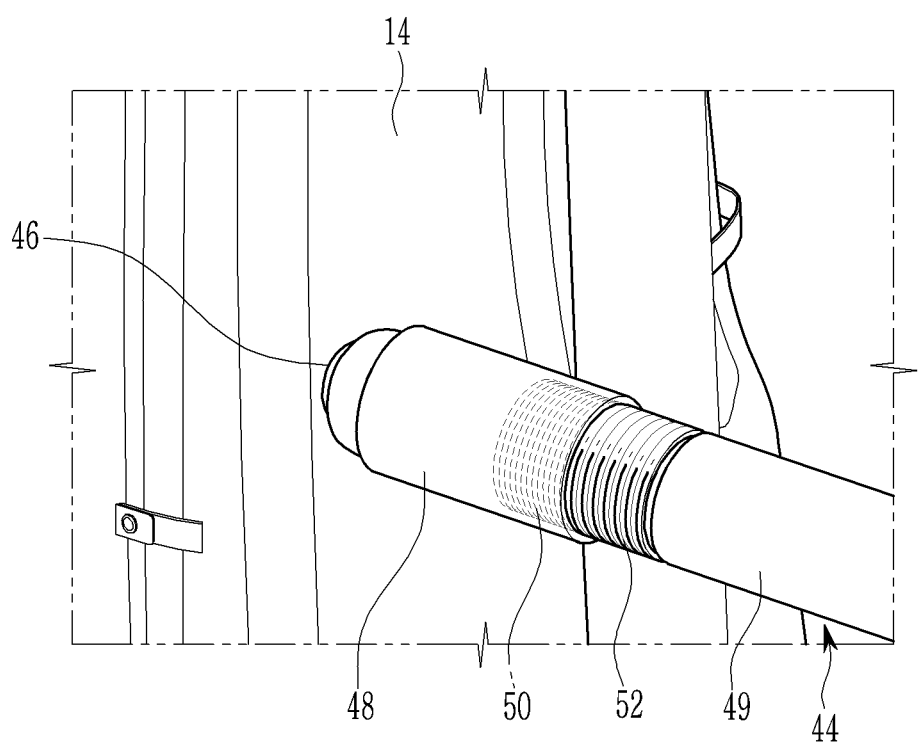
FIG. 7 and FIG. 8 are each a partial perspective view showing a second fixed bar of the removable vehicle partition according to an exemplary embodiment.
Figure 8:
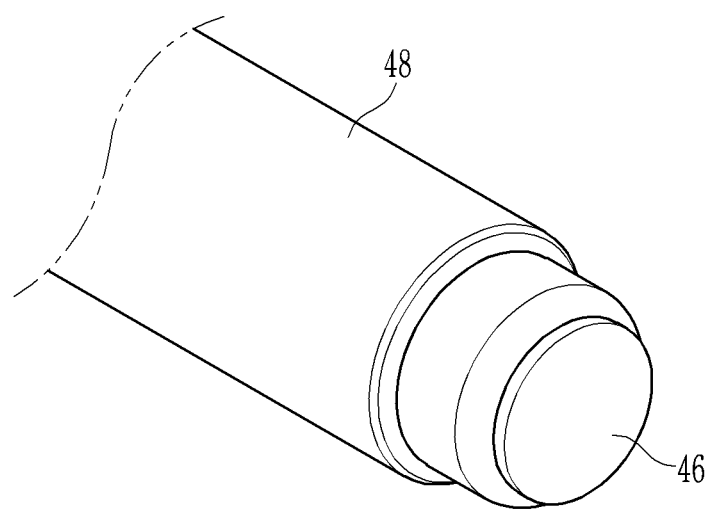

FIG. 7 and FIG. 8 are each a partial perspective view showing a second fixed bar of the removable vehicle partition according to an exemplary embodiment.

Referring to FIG. 1, FIG. 2, FIG. 7 and FIG. 8, the vehicle body frame fixing bar 30 may further include a second fixing bar 44 fixed in close contact with the vehicle body 10.

The second fixing bar 44 may include friction pads 46 that are provided at both ends of the second fixing bar 44 and adhere to the vehicle body 10.

The friction pad 46 may be a rubber or plastic material with elastic and frictional force. For example, it can fix the inflatable tube 20 by closely adhering to the pillar trim 14 of the B pillar 12.

The second fixing bar 44 includes at least two connecting pipes 48, and 49, and an inner thread 50 may be formed in any one of the at least two connecting pipes 48, and 49, and an outer thread 52 engaging with the inner thread 50 may be formed in at least the other one. And the length can be adjusted by rotating any one of the at least two connecting pipes 48, and 49.

Although the drawing shows that the inner thread 50 is formed on the outer connection pipe 48 and the outer thread 52 is formed on the inner connection pipe 49, but is not limited thereto, and vice versa. It is possible to adjust the length of the second fixing bar 44 by simple rotation operation.

Referring to FIG. 2, the second fixing bar 44 may include an upper bar 51 that is spaced apart from the first fixing bar 32 and mounted on its upper part, and a lower bar 53 that is spaced apart from the first fixing bar 32 and mounted on its lower part.

The second fixing bar 44 can firmly fix the inflatable tube 20, including the upper bar 51 and the lower bar 53 disposed above and below the first fixing bar 32.

Figure 9:
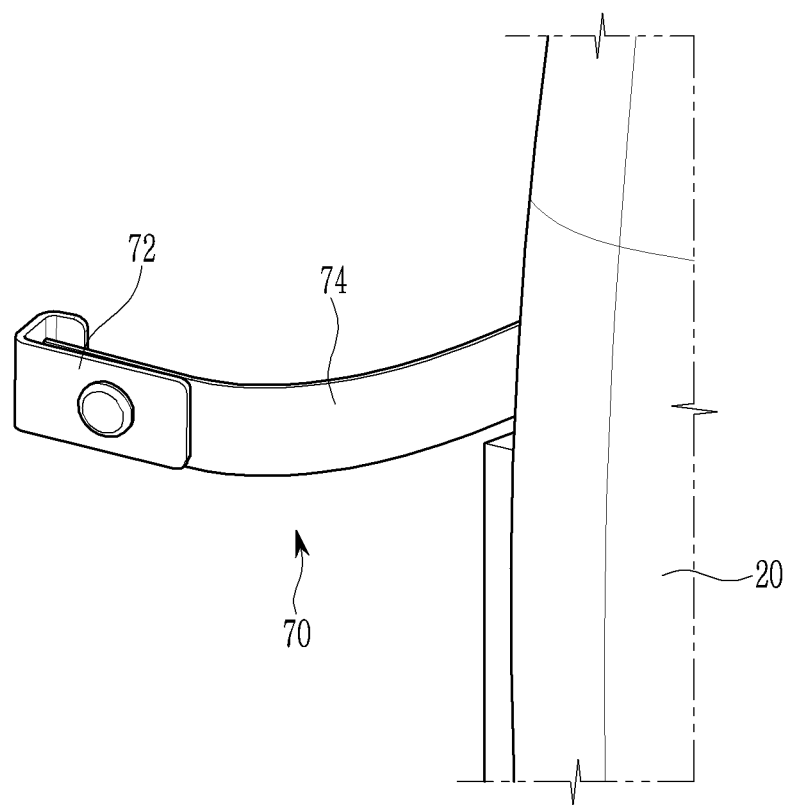
FIG. 9 is a perspective view showing a fixing portion of the removable vehicle partition according to an exemplary embodiment.
Figure 10:
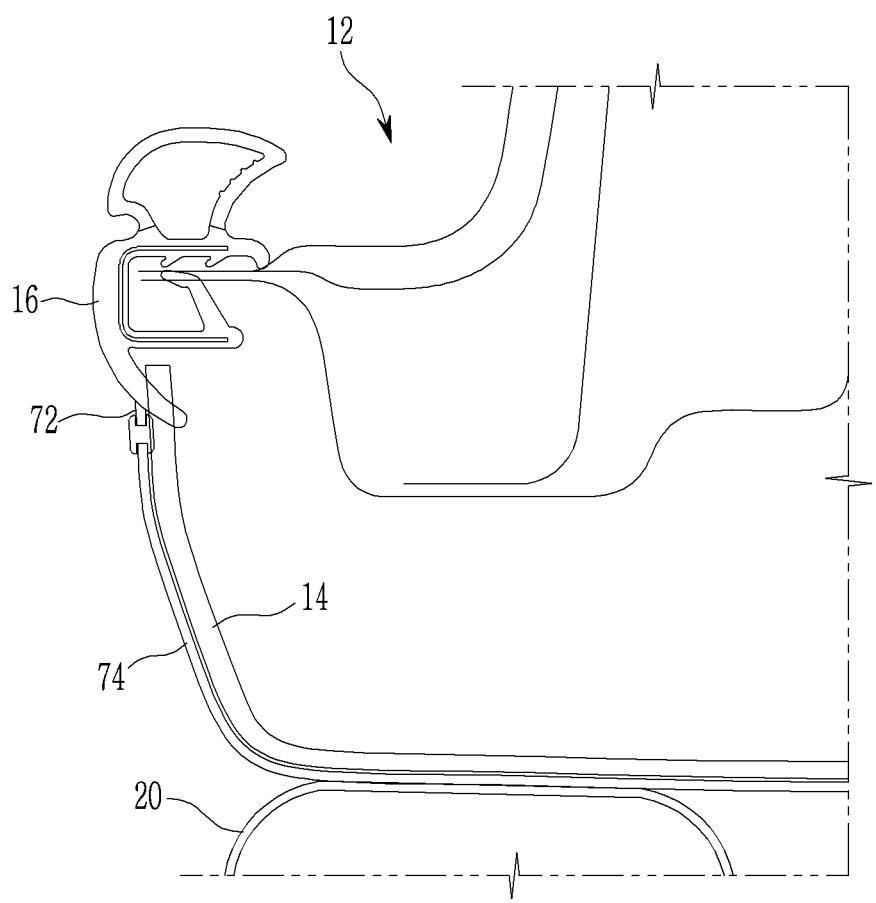
FIG. 10 is a cross-sectional view along the X-X line of FIG. 1.

FIG. 9 is a perspective view showing a fixing portion of the removable vehicle partition according to an exemplary embodiment, and FIG. 10 is a cross-sectional view along the X-X line of FIG. 1.

Referring to FIG. 2, FIG. 9 and FIG. 10, the removable vehicle partition may further include a fixing portion 70 connected to the inflatable tube 20 to fix the inflatable tube 20 to the vehicle body 10;

The fixing portion 70 may include a hook 72 fixed to the vehicle body 10, and a band 74 of an elastic material connecting the hook 72 and the inflatable tube 20.

For example, the hook 72 can be secured between the pillar trim 14 and weather strip 16 of the B pillar 12, and the weather strip 16 can wrap the exterior of the hook 72 to prevent external exposure. In addition, the band 74 is an elastic material that can firmly attach the inflatable tube 20 to the B pillar 12.

Figure 11:
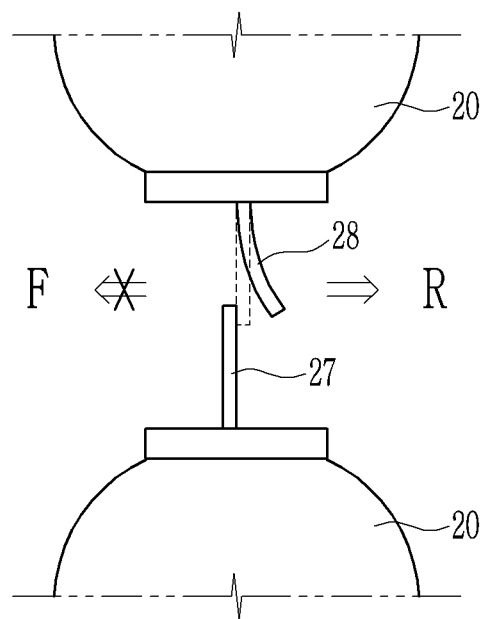
FIG. 11 is a cross-sectional view along the XI-XI line of FIG. 1.

FIG. 11 is a cross-sectional view along the XI-XI line of FIG. 1.

Referring to FIG. 1, FIG. 2 and FIG. 11, the removable vehicle partition according to an exemplary embodiment may further include an extractor grill 26 mounted on the inflatable tube 20, allowing air circulation from the vehicle body 10 front part F separated by the inflatable tube 20 to the vehicle body 10 rear part R, and blocking the air circulation from the vehicle body 10 rear part R to the front part F of the vehicle body 10.

For example, the extractor grill 26 may have a fixed cover 27 and a soft cover 28 provided therein, and the soft cover 28 may be selectively separated from the fixed cover 27 according to air circulation.

When the door at the rear of the vehicle is opened and closed, the pressure in the cabin with a patient infected with virus or bacteria may drop or increase momentarily, and there is a possibility that the inflatable tube 20 will be separated from the vehicle body 10 due to this momentary pressure difference. However, the extractor grill 26 may allow air circulation from the front F to the rear R, thereby preventing the possibility of separation of the inflatable tube 20. In addition, the extractor grill 26 blocks air circulation from the rear part R of the vehicle body 10 to the front part F of the vehicle body 10 to prevent infection of the driver.

In an exemplary embodiment, the extractor grill 26 has been described for example as including the fixed cover 27 and the soft cover 28, but is not limited thereto, various configurations allowing only air circulation to either side. For example, check valve configuration may be applied.

Figure 12:
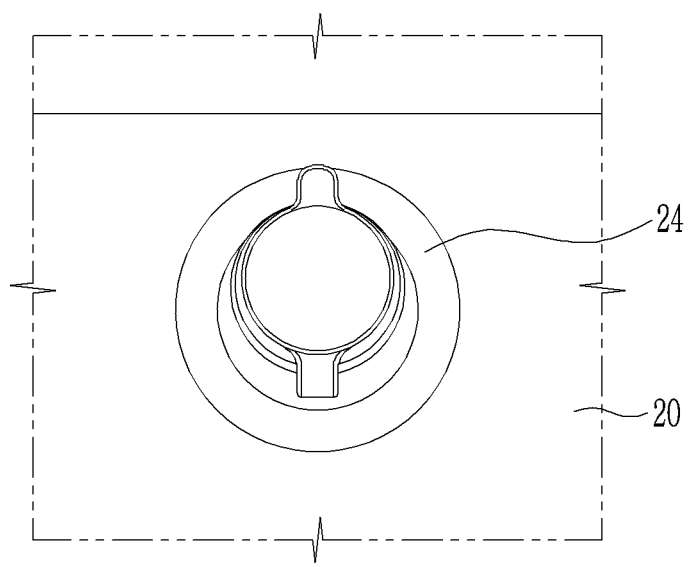
FIG. 12 is a drawing showing an air inlet of the removable vehicle partition according to an exemplary embodiment.

FIG. 12 is a drawing showing an air inlet of the removable vehicle partition according to an exemplary embodiment.

The removable vehicle partition according to an exemplary embodiment may further include an air inlet 24 formed in the inflatable tube 20. The air inlet 24 may be, for example, a widely used inlet used for a swimming tube, etc., and the inflatable tube 20 may be expanded using a widely used air pump.

Figure 13:
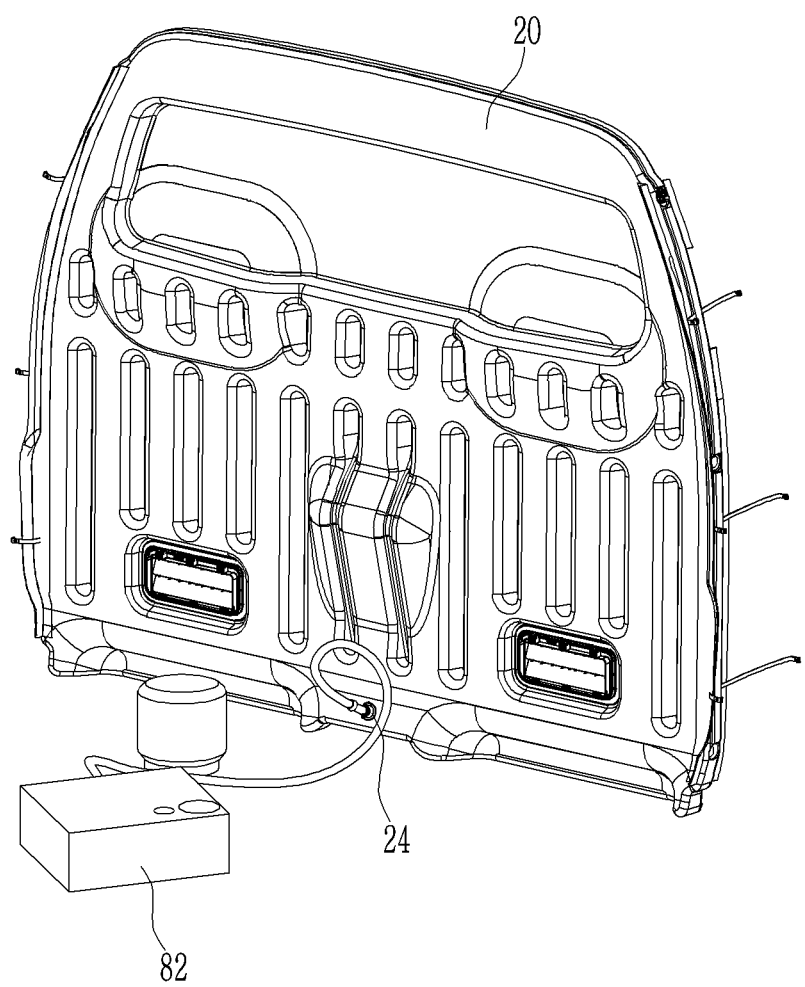
FIG. 13 is a drawing showing a tire mobility kit of the removable vehicle partition according to an exemplary embodiment.

FIG. 13 is a drawing showing a tire mobility kit of the removable vehicle partition according to an exemplary embodiment.

Referring to FIG. 13, the removable vehicle partition according to an exemplary embodiment may further include a tire mobility kit 82 for injecting air into the inflatable tube 20.

For example, the tire mobility kit 82 is a configuration for injecting air into a tire in an emergency situation, and may be provided at the time of purchase of the vehicle or may be separately purchased and provided in the vehicle for emergencies. The tire mobility kit 82 is an automatic or manual air pump that can be mounted on the air inlet 24 to expand the inflatable tube 20.

Figure 14:
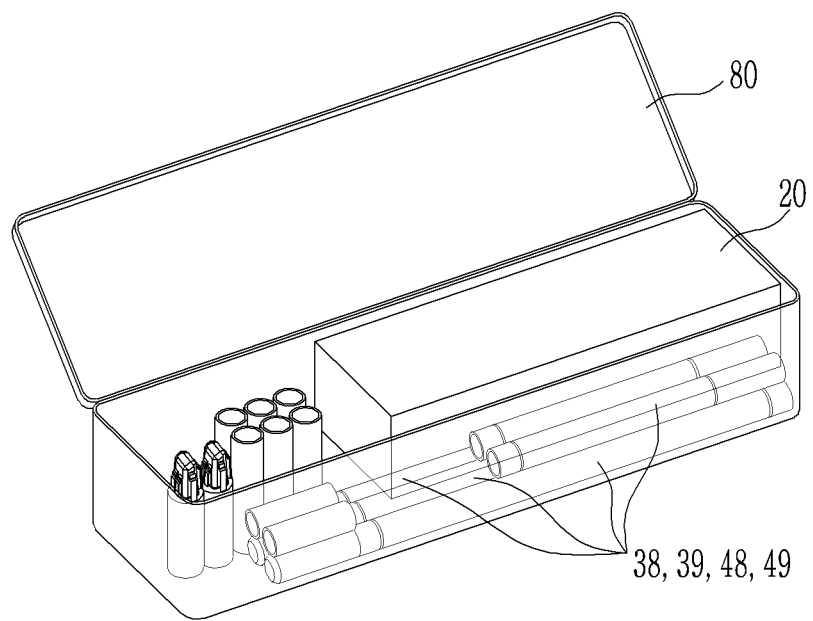
FIG. 14 is a drawing showing a storage box of the removable vehicle partition according to an exemplary embodiment.

FIG. 14 is a drawing showing a storage box of the removable vehicle partition according to an exemplary embodiment.

Referring to FIG. 14, the removable vehicle partition according to an exemplary embodiment may further include a storage box 80 for accommodating the inflatable tube 20 and the vehicle body frame fixing bar 30.

The inflatable tube 20 and the connection pipes 38, 39, 48, and 49 can be stored separately in the storage box 80, and the inflatable tube 20. And in an emergency situation, the vehicle partition can be mounted on the vehicle body 10 by assembling the inflatable tube 20 and the connection pipe 38, 39, 48, and 49.

As described above, the removable vehicle partition according to an exemplary embodiment is easy to mount and detach, so that it is possible to transport a patient infected with a virus or the like without modification of the vehicle body.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A removable vehicle partition comprising:
   an inflatable tube;
   at least one vehicle body frame fixing bar connected to the inflatable tube and configured to fix the inflatable tube to an inside of a vehicle body; and
   a sealing pad attached to an outside of the inflatable tube, the sealing pad configured to tightly connect the inflatable tube to the inside of the vehicle body,
   wherein the sealing pad comprises:
      at least two silicone pads adherable to the inside of the vehicle body, and
      a foam pad arranged between the silicone pads, and
   wherein the foam pad is tightly attachable to the inside of the vehicle body.

2. The removable vehicle partition of claim 1, wherein the foam pad is adherable to the inside of the vehicle body.

3. The removable vehicle partition of claim 1, wherein the vehicle body frame fixing bar comprises a first fixing bar insertable and fixable in an air bag cover hole of the vehicle body.

4. A removable vehicle partition comprising:
   an inflatable tube; and
   at least one vehicle body frame fixing bar connected to the inflatable tube and configured to fix the inflatable tube to an inside of a vehicle body,
   wherein the vehicle body frame fixing bar comprises a first fixing bar insertable and fixable in an air bag cover hole of the vehicle body, and
   wherein the first fixing bar comprises:
      an insert portion provided at both ends of the first fixing bar, the insert portion configured to be inserted into the air bag cover hole, and
      an elastic clip mounted on the insert portion.

5. The removable vehicle partition of claim 3,
   wherein the first fixing bar comprises:
      at least a first connecting pipe comprising an inner thread,
      at least a second connecting pipe comprising an outer thread configured to engage in the inner thread, and
      wherein a length of the first fixing bar is adjustable by rotating the first connecting pipe and/or the second connecting pipe.

6. The removable vehicle partition of claim 3, wherein the vehicle body frame fixing bar further comprises a second fixing bar fixed tightly fixable to the vehicle body.

7. The removable vehicle partition of claim 6,
   wherein the second fixing bar comprises friction pads provided at both ends of the second fixing bar and adherable to the vehicle body, and
   wherein the second fixing bar comprises an upper bar spaced apart from the first fixing bar and mounted on its upper part and a lower bar spaced apart from the first fixing bar and mounted on its lower part.

8. The removable vehicle partition of claim 6, wherein the second fixing bar comprises:
   at least two connecting pipes,
   at least a first connecting pipe comprising an inner thread,
   at least a second connecting pipe comprising an outer thread configured to engage in the inner thread, and
   wherein a length of the second fixing bar is adjustable by rotating the first connecting pipe and/or the second connecting pipe.

9. The removable vehicle partition of claim 1, further comprising:
   a fixing portion connected to the inflatable tube, the fixing portion configured to fix the inflatable tube to the vehicle body,
   wherein the fixing portion comprises a hook fixable to the vehicle body and a band of an elastic material connecting the hook and the inflatable tube.

10. The removable vehicle partition of claim 1, further comprising a partition glass of a transparent material mounted on the inflatable tube.

11. The removable vehicle partition of claim 1, further comprising an air inlet formed in the inflatable tube.

12. A removable vehicle partition comprising:
    an inflatable tube;
    at least one vehicle body frame fixing bar connected to the inflatable tube and configured to fix the inflatable tube to an inside of a vehicle body;
    an extractor grill mounted on the inflatable tube, wherein the extraction grill is configured to:
       allow air circulation from a vehicle body front part separated by the inflatable tube to a vehicle body rear part, and
       block the air circulation from the vehicle body rear part to the front part of the vehicle body; and
    a sealing pad attached to an outside of the inflatable tube, the sealing pad configured to tightly connect the inflatable tube to the inside of the vehicle body,
    wherein the sealing pad comprises:
       at least two silicone pads adherable to the inside of the vehicle body, and
       a foam pad arranged between the silicone pads, and
    wherein the foam pad is tightly attachable to the inside of the vehicle body.

13. The removable vehicle partition of claim 1, further comprising a storage box for accommodating the inflatable tube and the vehicle body frame fixing bar.

14. The removable vehicle partition of claim 1, further comprising a tire mobility kit configured to inject air into the inflatable tube.

15. The removable vehicle partition of claim 4,
    wherein the first fixing bar comprises:
       at least a first connecting pipe comprising an inner thread,
       at least a second connecting pipe comprising an outer thread configured to engage in the inner thread, and
       wherein a length of the first fixing bar is adjustable by rotating the first connecting pipe and/or the second connecting pipe.

16. The removable vehicle partition of claim 4, wherein the vehicle body frame fixing bar further comprises a second fixing bar fixed tightly fixable to the vehicle body.

17. The removable vehicle partition of claim 6,
wherein the second fixing bar comprises friction pads provided at both ends of the second fixing bar and adherable to the vehicle body, and
wherein the second fixing bar comprises an upper bar spaced apart from the first fixing bar and mounted on its upper part and a lower bar spaced apart from the first fixing bar and mounted on its lower part.

18. The removable vehicle partition of claim 5, wherein the vehicle body frame fixing bar further comprises a second fixing bar tightly fixable to the vehicle body, the second fixing bar comprising:
at least two connecting pipes,
at least a first connecting pipe comprising an inner thread,
at least a second connecting pipe comprising an outer thread configured to engage in the inner thread, and
wherein a length of the second fixing bar is adjustable by rotating the first connecting pipe and/or the second connecting pipe.

19. The removable vehicle partition of claim 12, further comprising a partition glass of a transparent material mounted at the inflatable tube.

20. The removable vehicle partition of claim 19, further comprising an air inlet located in the inflatable tube.

* * * * *